US007124360B1

(12) United States Patent
Drenttel et al.

(10) Patent No.: US 7,124,360 B1
(45) Date of Patent: Oct. 17, 2006

(54) METHOD AND SYSTEM FOR COMPUTER SCREEN LAYOUT BASED ON A RECOMBINANT GEOMETRIC MODULAR STRUCTURE

(76) Inventors: William Drenttel, P.O. Box 159, Falls Village, CT (US) 06031; Jessica Helfand, P.O. Box 159, Falls Village, CT (US) 06031

( * ) Notice: Subject to any disclaimer, the term of this patent is extended or adjusted under 35 U.S.C. 154(b) by 0 days.

(21) Appl. No.: 09/366,858

(22) Filed: Aug. 4, 1999

(51) Int. Cl.
*G06F 15/00* (2006.01)

(52) U.S. Cl. ...................... 715/517; 715/518; 715/520; 715/764

(58) Field of Classification Search ................ 707/517, 707/518, 520, 513; 345/764, 788–789, 792; 715/517, 518, 520, 764, 513, 500
See application file for complete search history.

(56) References Cited

U.S. PATENT DOCUMENTS 5,371,847 A * 12/1994 Hargrove .................... 345/788
5,390,295 A * 2/1995 Bates et al. ................. 345/789
5,517,621 A * 5/1996 Fukui et al. ................ 715/517
5,689,665 A * 11/1997 Mitsui et al. ............... 345/803
5,762,561 A * 6/1998 Zine .......................... 473/131
5,796,402 A * 8/1998 Ellison-Taylor ............. 345/792
5,900,002 A * 5/1999 Bottomly .................... 715/517
6,008,809 A * 12/1999 Brooks ....................... 345/792
6,144,991 A * 11/2000 England ..................... 345/733
6,222,947 B1 * 4/2001 Koba ......................... 382/284
6,266,684 B1 * 7/2001 Kraus et al. ................ 715/513
6,289,361 B1 * 9/2001 Uchida .................... 715/501.1
6,310,631 B1 * 10/2001 Cecco et al. ................ 345/792
6,589,292 B1 * 7/2003 Langford-Wilson ......... 715/517
6,694,487 B1 * 2/2004 Ilsar .......................... 715/527
2002/0004805 A1 * 1/2002 Nojima et al. .............. 707/520
2003/0229856 A1 * 12/2003 Lynn et al. ................. 715/517

OTHER PUBLICATIONS

Courter et al., "Mastering Microsoft Office 2000 Professional", ISBN 0782123139, Pub. Date Feb. 1999, pp. 105-145; 937-981; and 1031-1056.*
"Microsoft FrontPage 98", copyright 1997 by Sams.net Publishing, pp. 359-381.*
"SoftQuad HotMetal Pro 3.0", copyright 1996, pp. 69-86.*
Shafran, "teach yourself Microsoft FrontPage 98 in 24 hours", copyright 1997 by Sams.net Publishing, first editor, pp. 184-198.*

* cited by examiner

*Primary Examiner*—Stephen Hong
*Assistant Examiner*—Thu V. Huynh
(74) *Attorney, Agent, or Firm*—Evelyn M. Sommer

(57) ABSTRACT

A system comprising templates for entering and displaying information/data, such as in a Web page or browser, or in the interface for software or an operating system is disclosed. The screen is divided into an array of grids filling the entire area of the template. At least one, and preferably a majority of the grids are dimensioned based on the proportions of traditional Japanese tatami mats. The grids guide design decisions made by the interface designer or graphics designer in carving up and organizing a page, creating an underlying structure and framework for laying out and displaying the information/data. A primary application of the template is in interface and website design, in which the template automatically divides the screen into frames, each frame being used to enter, edit and/or display information on the computer screen or Web page. The system optionally allows an end-user to reposition the grids within the template, reorganizing the information/data to suit specific needs. The system also has application to the control of the directional flow of language, wherein repositionable grids are oriented to facilitate vertical or horizontal flow of text positioned within said grids.

17 Claims, 10 Drawing Sheets

Fig. 8a – PRIOR ART

METHOD AND SYSTEM FOR COMPUTER SCREEN LAYOUT BASED ON A RECOMBINANT GEOMETRIC MODULAR STRUCTURE

FIELD OF THE INVENTION

The present invention relates generally to screen or page layouts. More particularly, the present invention relates to a method and system for arranging text and graphic images on a computer screen or printed page. The present invention may have applications including the design and layout of World Wide Web sites and operating system interfaces.

BACKGROUND OF THE PRESENT INVENTION

Initially, the Internet was a private network for government and academia that facilitated the exchange of text-based research across electronically-linked phone lines. More recently, the World Wide Web ("the Web") has grown from the Internet to include a broader demographic reach by enabling the transmittal of multiple types of media in addition to plain text. However, despite the sophistication of contemporary browser technologies, the web remains an increasingly difficult environment in which to present complex information in a simple manner.

In the absence of compositional limitations, content developers try desperately to incorporate a wide variety of material types, including text and images, charts and research databases, stock tickers and transactional services, search engines and reference materials, plus personal files, linked files, and even linked applications. Additionally, this array of content and material types is being delivered and filtered through constantly changing technology and with ever evolving modes of presentation. While there are new and better delivery vehicles for this endless stream of content, what is missing is an underlaying visual structure for organizing and displaying this content.

Web-site authoring software assists content developers in creating the hyper-text mark-up language ("HTML") necessary to enable such material to be "published" on the Web, but the resulting material is often poorly presented, and difficult to access, to navigate, and to understand. Some Web-site authoring tools, such as Fusion™, available from NetObjects of Redwood City, Calif., offer a variety of page templates for the insertion and subsequent display of information including text and graphics. These page templates are professionally designed single pages or forms containing generic content which is used as a placeholder for the content developers to replace with their own content or information. As such, the templates help the web page designer carve up a page or screen and create a framework in which information may be entered and displayed. Fusion™, for example, offers a variety of combined column and row based layout templates, as well as a set of templates designed for specific subject matter such as archives, billing forms, calendar of events, employee profiles, etc.

Although generic templates offer an attempted solution to this "web" of confusion, a more harmonious system of templates is needed to make this solution more reliable and more adaptable for different user needs. Accordingly, a system that offers a reliable and flexible toolkit for information architecture and display, and that provides a series of harmonious and coordinated templates to help developers edit, organize, and display their content to the users who need them most, is needed.

Further, such a system for information architecture and management has numerous potential applications, including but not limited to a series of layout templates for site-authoring software; an interface structure for user-driven information arrangement within an Internet or Intranet browser (e.g., user-driven personalization in My Netscape™ or My Yahoo™); or an interface structure for organizing files at the level of a computer operating system (e.g. windows sizeable and moveable by a user, but constrained to a given grid, or that open in fixed sizes, or that "snap to" fixed positions on a pre-determined grid structure). In each instance, the proposed invention offers a system for creating order in the display of information.

Because information is often presented on a computer screen, the manner of presentation on such a screen is an important aspect of the above objects. Computer screens generally are in the form of a rectangular module. Although at first impression, the shape of a computer screen may be considered uninteresting, user perception of the screen, and the information thereby displayed, is in fact influenced by a host of cultural associations. Consequently, interpretations of something as simple as a rectangle can vary, suggesting different social, symbolic, metaphorical, aesthetic and even spiritual qualities that affect our understanding of, and relationship to, a computer interface through a computer screen.

SUMMARY OF THE INVENTION

It is therefore an object of the present invention to provide an improved organizational framework for information provided by computer interfaces such as used to create web pages or computer operating systems user-interfaces.

It is a related object of the present invention to provide a system that offers a reliable and flexible toolkit for information architecture and display, and that provides a series of templates to help developers edit, organize, and display their content to the users.

These and other objects, features, and advantages of the present invention are accomplished in accordance with the principles of the present invention by invoking the geometric and proportional imperatives of the classic Japanese Tatami mat, to provide editing, visualization, and site architecture tools that enable developers to create screen designs, such as Internet or Intranet sites, or operating system user-interfaces, that simplify information by making it visually appealing, culturally relevant, and functionally clear. The seemingly conflicting ideals of computer information sites are resolved in accordance with the principles of the present invention by using design in general (and geometry in particular) as powerful tools for communication, information delivery, and exchange.

The present invention provides a design system that consists of a series of grid templates arranged in accordance with the recombinant geometries and compositional imperatives of the classic Japanese Tatami mat. The aspect ratio of the Japanese Tatami mat is based on a double square (a two-to-one ratio), which, in combination, lends itself to the basic proportions of a standard 15-inch computer monitor. The concept behind the present invention—the provision of a graphical grid, based on Tatami mat proportions, for displaying information on a computer screen—is a simple way to approach site design and information organization. The grid provided by the present invention is based on mathematically predetermined proportions—the modules of the grid work in varying combinations and can be repositioned.

The above and other objects, features, and advantages of the present invention will be readily apparent from the following detailed description of the invention taken in conjunction with the accompanying drawings wherein like reference characters represent like elements, the scope of the invention being set out in the appended claims.

BRIEF DESCRIPTION OF THE DRAWINGS

For a more complete understanding of the present invention, reference is made to the following Detailed Description taken in conjunction with the accompanying drawings in which:

FIGS. 2Aa and 2Ab show alternative templates based on the template of FIG. 2A, but with one of the grids further divided in half;

FIGS. 2Ba and 2Bb show alternative templates based on the template of FIG. 2B, but with one of the grids further divided in half;

FIGS. 3Aa, 3Ab, and 3Ac show alternative templates based on the template of FIG. 3A, but with one of the grids further divided in half;

FIGS. 3Ba, 3Bb, and 3Bc show alternative templates based on the template of FIG. 3B, but with one of the grids further divided in half;

FIGS. 3Ca, 3Cb, and 3Cc show alternative templates based on the template of FIG. 3C, but with one of the grids further divided in half;

FIGS. 4Aa, 4Ab, 4Ac, and 4Ad show alternative templates based on the template of FIG. 4A, but with one of the grids further divided in half;

FIGS. 4Ba, 4Bb, 4Bc, and 4Bd show alternative templates based on the template of FIG. 4B, but with one of the grids further divided in half;

FIGS. 4Ca, 4Cb, 4Cc, and 4Cd show alternative templates based on the template of FIG. 4C, but with one of the grids further divided in half;

FIGS. 4Da, 4Db, 4Dc, and 4Dd show alternative templates based on the template of FIG. 4D, but with one of the grids further divided in half;

FIGS. 4Ea, 4Eb, 4Ec, and 4Ed show alternative templates based on the template of FIG. 4E, but with one of the grids further divided in half;

FIGS. 5Aa, 5Ab, 5Ac, 5Ad, 5Ae, and 5Af show alternative templates based on the template of FIG. 5A, but with one of the grids further divided in half;

FIGS. 5Ba, 5Bb, 5Bc, 5Bd, 5Be, and 5Bf show alternative templates based on the template of FIG. 5B, but with one of the grids further divided in half;

FIGS. 5Ca, 5Cb, 5Cc, 5Cd, 5Ce, and 5Cf show alternative templates based on the template of FIG. 5C, but with one of the grids further divided in half;

FIGS. 5Da, 5Db, 5Dc, 5Dd, 5De, and 5Df show alternative templates based on the template of FIG. 5D, but with one of the grids further divided in half;

FIGS. 5Ea, 5Eb, 5Ec, 5Ed, 5Ee, and 5Ef show alternative templates based on the template of FIG. 5E, but with one of the grids further divided in half;

FIGS. 5Fa, 5Fb, 5Fc, 5Fd, 5Fe, and 5Ff show alternative templates based on the template of FIG. 5F, but with one of the grids further divided in half;

FIGS. 5Ga, 5Gb, 5Gc, 5Gd, 5Ge, and 5Gf show alternative templates based on the template of FIG. 5G, but with one of the grids further divided in half;

FIGS. 5Ha, 5Hb, 5Hc, 5Hd, 5He, and 5Hf show alternative templates based on the template of FIG. 5H, but with one of the grids further divided in half;

FIGS. 5Ia, 5Ib, 5Ic, 5Id, 5Ie, and 5If show alternative templates based on the template of FIG. 5I, but with one of the grids further divided in half;

FIGS. 5Ja, 5Jb, 5Jc, 5Jd, 5Je, and 5Jf show alternative templates based on the template of FIG. 5J, but with one of the grids further divided in half;

FIGS. 5Ka, 5Kb, 5Kc, 5Kd, 5Ke, and 5Kf show alternative templates based on the template of FIG. 5K, but with one of the grids further divided in half;

DETAILED DESCRIPTION

Figures 1, 2A, 2B:
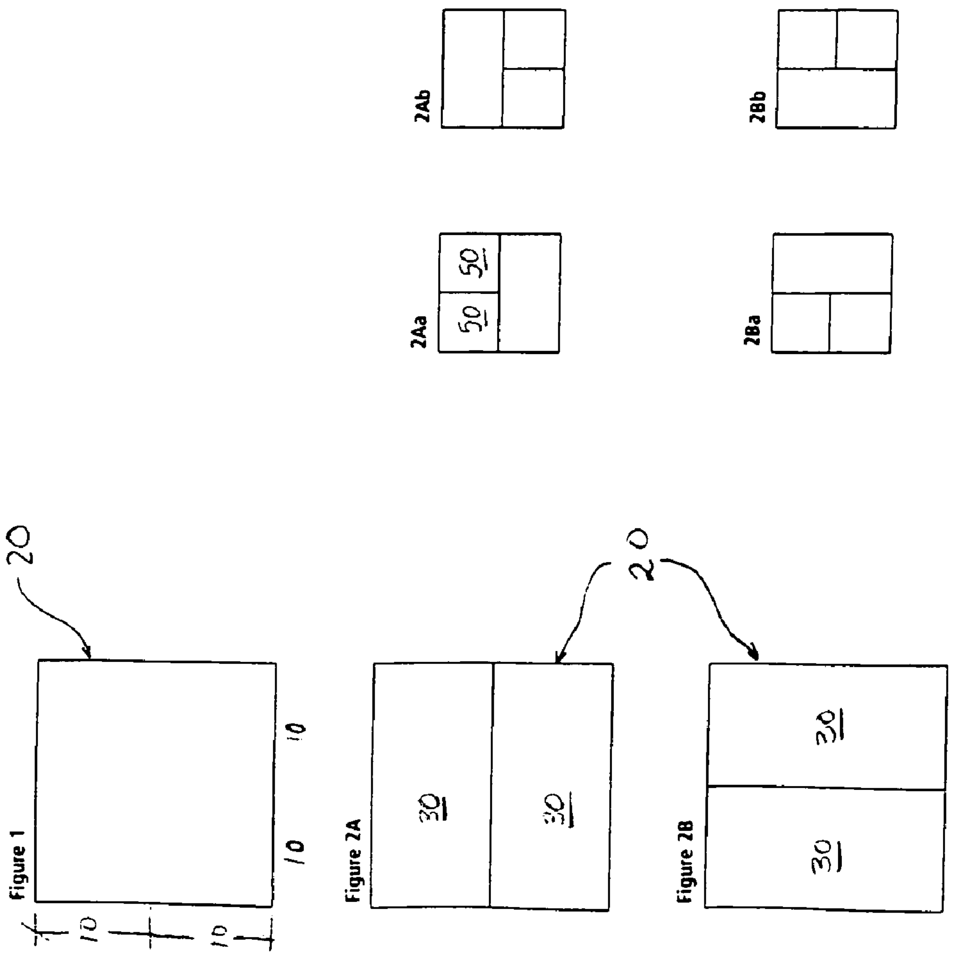
FIG. 1 illustrates a screen having a two-by-two dimensional configuration.
FIGS. 2A and 2B show templates having the two-by-two dimensional ratio of FIG. 1 and divided into a grid structure based on a Japanese tatami mat.

In general, a computer screen or page is in the form of a quadrilateral that may be divided to correspond to a first whole number of dimensional units 10 (*x*) in a first direction of measurement (e.g., height) by a second whole number of dimensional units 10 (*y*) in a second direction of measurement (e.g., width). For instance, as illustrated in FIG. 1, a template 20 may have a two-by-two dimensional configuration, i.e., a first measurement of two dimensional units 10 and a second measurement of two dimensional units 10. Computer templates for entry and display of information are usually subdivided into a variety of shapes having dimensions based on random combinations of dimensional units. In accordance with the principles of the present invention, instead of providing templates having arbitrarily shaped and dimensioned grids, a system of screen templates 20 are provided with a plurality of grids arranged in accordance with the recombinant geometries and compositional imperatives of the classic Japanese tatami mat. The present invention thus provides a design system consisting of a series of templates resembling Japanese tatami mats and thus is referenced herein as "TatamiNet."

The traditional tatami mat is a floor mat or series of floor mats used to define and subdivide space within a given room. The proportions of a tatami mat have been standardized as a rectangle with approximately a two-to-one ratio. The templates 20 of TatamiNet are divided into grids proportionally based on the aspect ratio of the tatami mat's double square configuration. Thus, the present invention provides a user interface on a computer screen (likened to a room in which tatami mats are to be laid), or document, that is subdivided into a grid of areas herein referred to as "tatami mats" 30, each mat 30 having approximately a two-by-one dimensional configuration (measurements of dimensional units in a first and a second measurement direction) of a traditional Japanese tatami mat. The grids are arranged to completely fill the entire information area provided by the template.

Figures 3A, 3B, 3C:
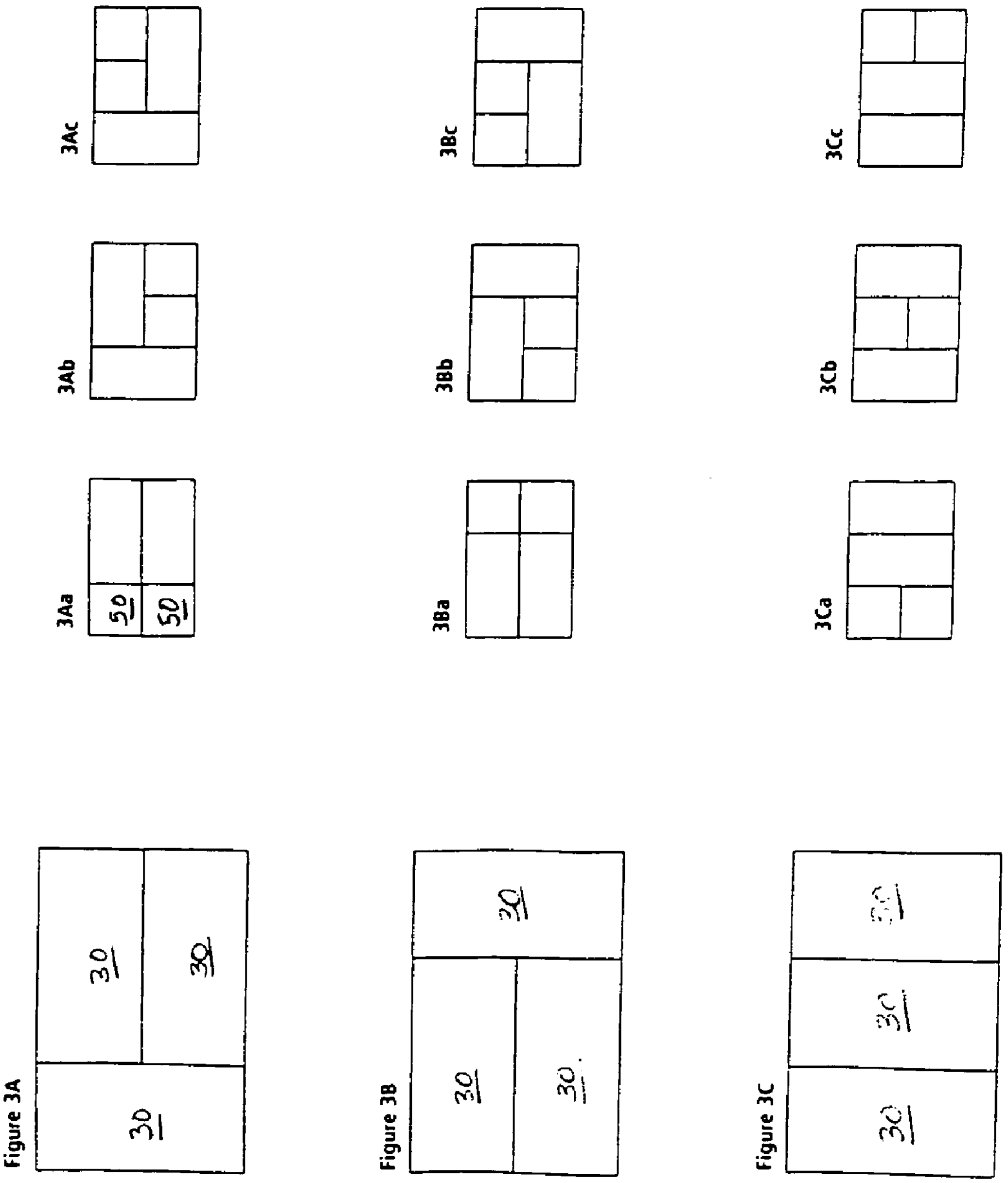
FIGS. 3A, 3B, and 3C show templates having a two-by-three dimensional ratio and divided into a grid structure based on a Japanese tatami mat.

As will be appreciated, various combinations of the TatamiNet may be created based on the basic two-to-one dimensional configuration ratio by combining mats of such proportions. The various templates of TatamiNet are selected and arranged depending on the proportions of the screen and the information to be provided such that the entire screen is divided into grids filling the template area. Thus, a screen having a two-by-two dimensional configuration may be subdivided into two side-by-side tatami mats 30, as shown in FIGS. 2A and 2B. A screen with a two-by-three dimensional configuration likewise may be subdivided into an array of three tatami mats 30, as shown in FIGS. 3A, 3B, and 3C. In a similar manner, screens with two-by-four dimensional configurations may be subdivided into an array of four tatami mats 30, as shown in FIGS. 4A–4E, and screens with a three-by-four dimensional configurations may be subdivided into an array of six tatami mats 30, as shown in FIGS. 5A–5K. As demonstrated by FIGS. 7A–7I detailing three-by-five dimensional configurations, the present invention is equally applicable to larger and varying screen sizes and proportions. The term "screen" as used herein may refer to the entire physical display, or as would be understood by those of skill in the art, a portion or window of the display. It will be further understood by those of ordinary skill in the art that the approximate two-by-one dimensions of the mats may be varied at a minimum in an amount sufficient to allow the application of the present invention to screen ratios of standard computer displays.

Because the dimensional configuration ratio, rather than the actual size, is the basis for the shape and dimension of mats 30 of the templates 20 of the present invention, the screen may be divided into larger-sized mats of the same traditional Japanese tatami mat two-by-one dimensional configuration ratio. For example, a screen larger than a two-by-four dimensioned screen, such as the three-by-four dimensioned screens shown in FIGS. 6A and 6B, may be provided with at least one double-sized tatami mat 40 having a two-by-four dimensional configuration (twice the size of the standard two-by-one ratio of mats 30). Standard-sized tatami mats 30 are also provided, such that the entire template 20 is subdivided into grids having the proportions of the traditional Japanese tatami mats.

Various other template dimensional configurations, for example three-by-five, four-by-four, four-by-five, etc. are possible. Moreover, such dimensional configurations as a three-by-five screen cannot be subdivided into a plurality of tatami mats 30 that would completely fill the screen. Accordingly, as shown in FIGS. 7A–7I, at least one square grid 50, having a one-by-one dimensional configuration ratio, must be provided so that the grids of template 20 completely fill the screen. It will be appreciated that a double-sized mat 40 may also be provided in combination with standard-sized tatami mats 30 to fill the screen. Mats 30, 40, and 50 may be arranged in a variety of manners to provide a number of templates 20 each having a different grid arrangement, as may be appreciated with reference to FIGS. 7A–7BD.

Although the present invention is specifically directed to the provision of template grids that are dimensioned based on the proportions of the traditional Japanese tatami mat, it is also within the scope of the present invention to provide smaller dimensioned grids. Specifically, square grids 50, such as provided in the three-by-five dimensioned templates of FIGS. 7A–7BD, which are essentially half of each tatami mat 30. Thus, any number of the tatami mats 30 of FIGS. 2A, 2B, 3A–3C, 4A–4E, 5A–5K, 6A, 6B, and 7A–7I may be further divided into individual square grids 50 having a one-by-one dimensional configuration ratio, so long as the grids of the desired dimensions fill the screen. This aspect of the present invention is consistent with the principles of the use of the tatami mat as a measure of space in Japanese architecture, wherein a room, or space, may be measured in both whole (a double square) and half (a single square) measures of Tatami.

Figures 4A, 4B, 4C, 4D, 4E:
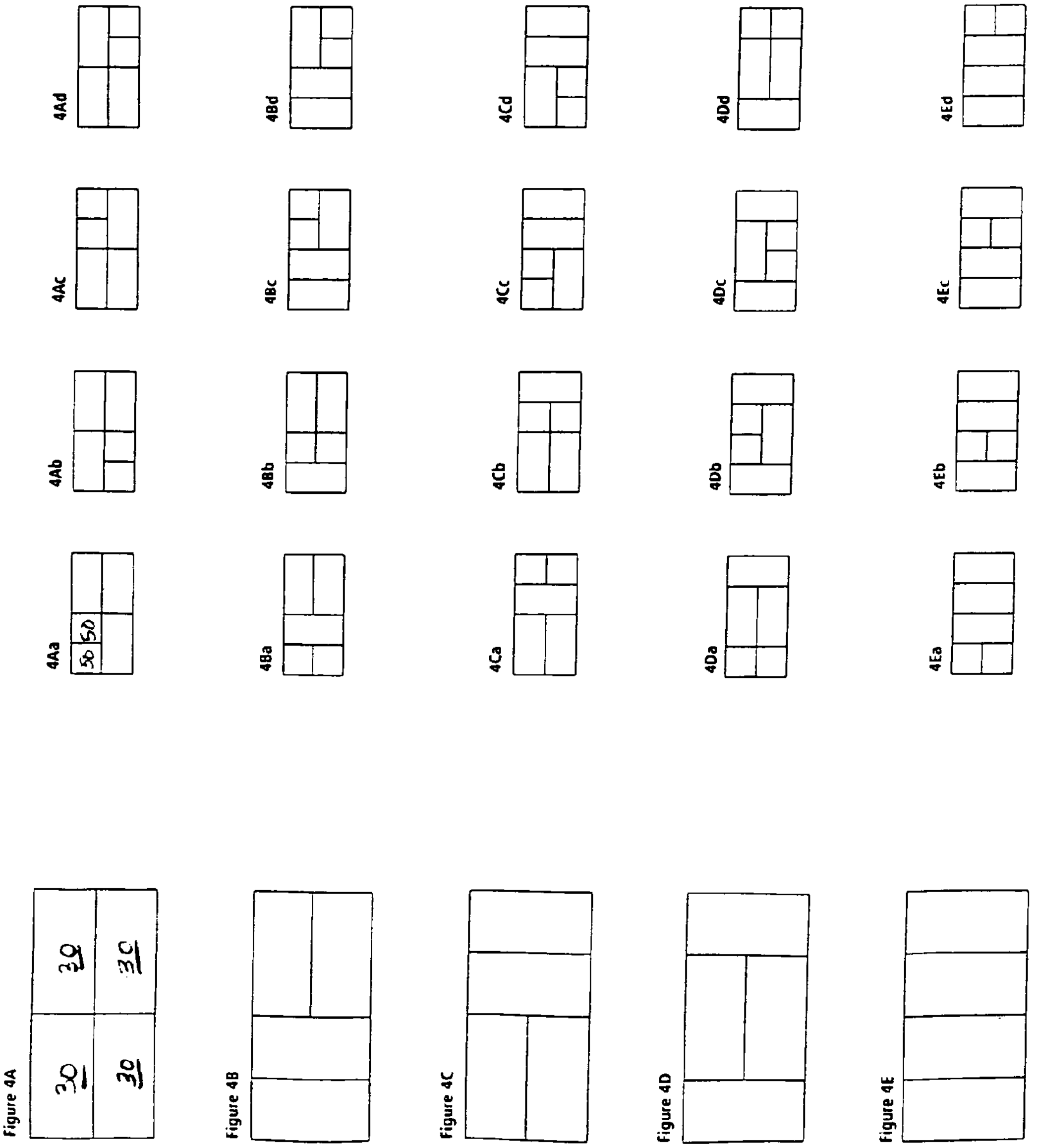
FIGS. 4A–4E show templates having a two-by-four dimensional ratio and divided into a grid structure based on a Japanese tatami mat.
Figures 5A, 5B, 5C, 5D, 5E, 5F, 5G:
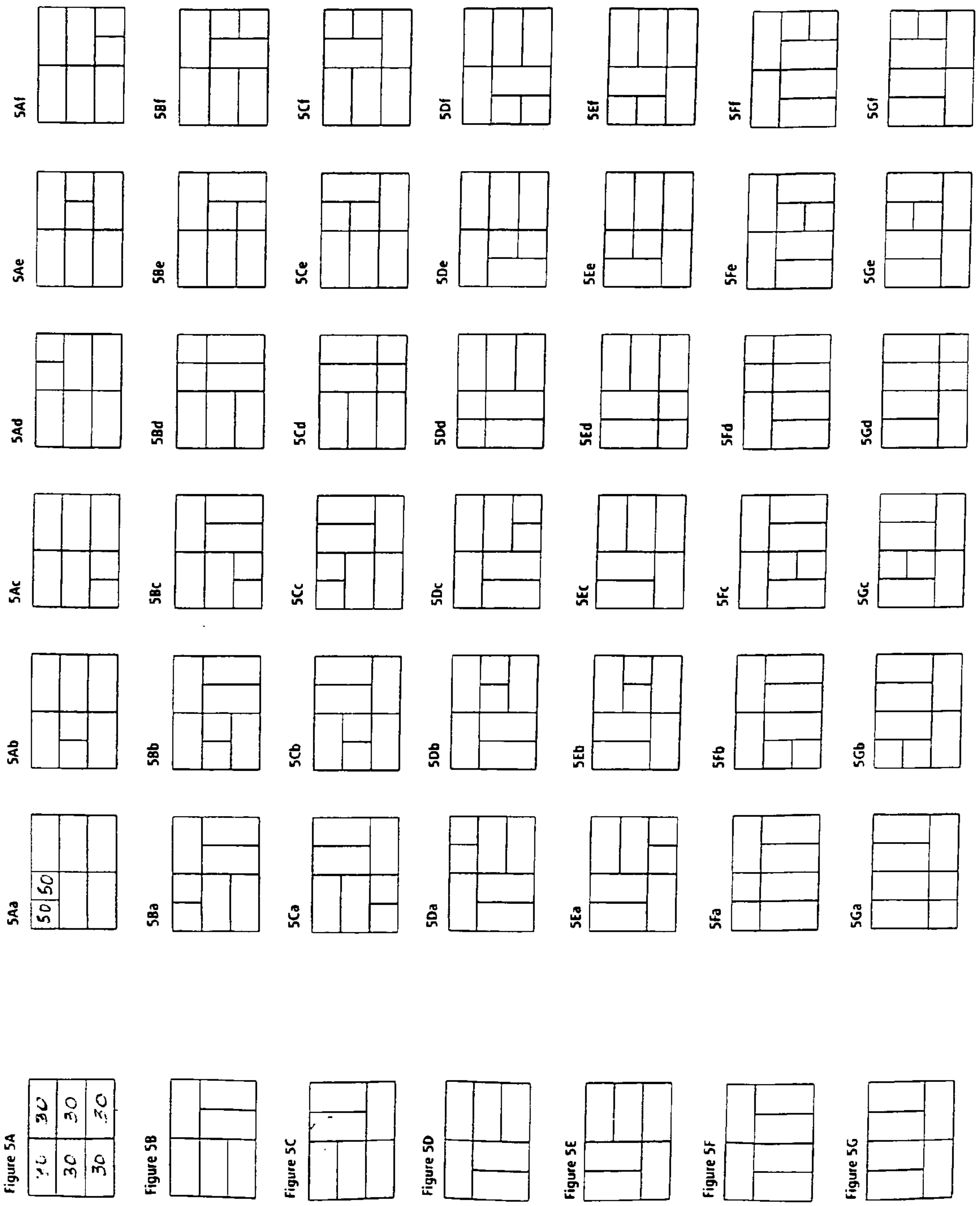
FIGS. 5A–5K show templates having a three-by-four dimensional ratio and divided into a grid structure based on a Japanese tatami mat.
Figures 5H, 5I, 5J, 5K, 6A, 6B:
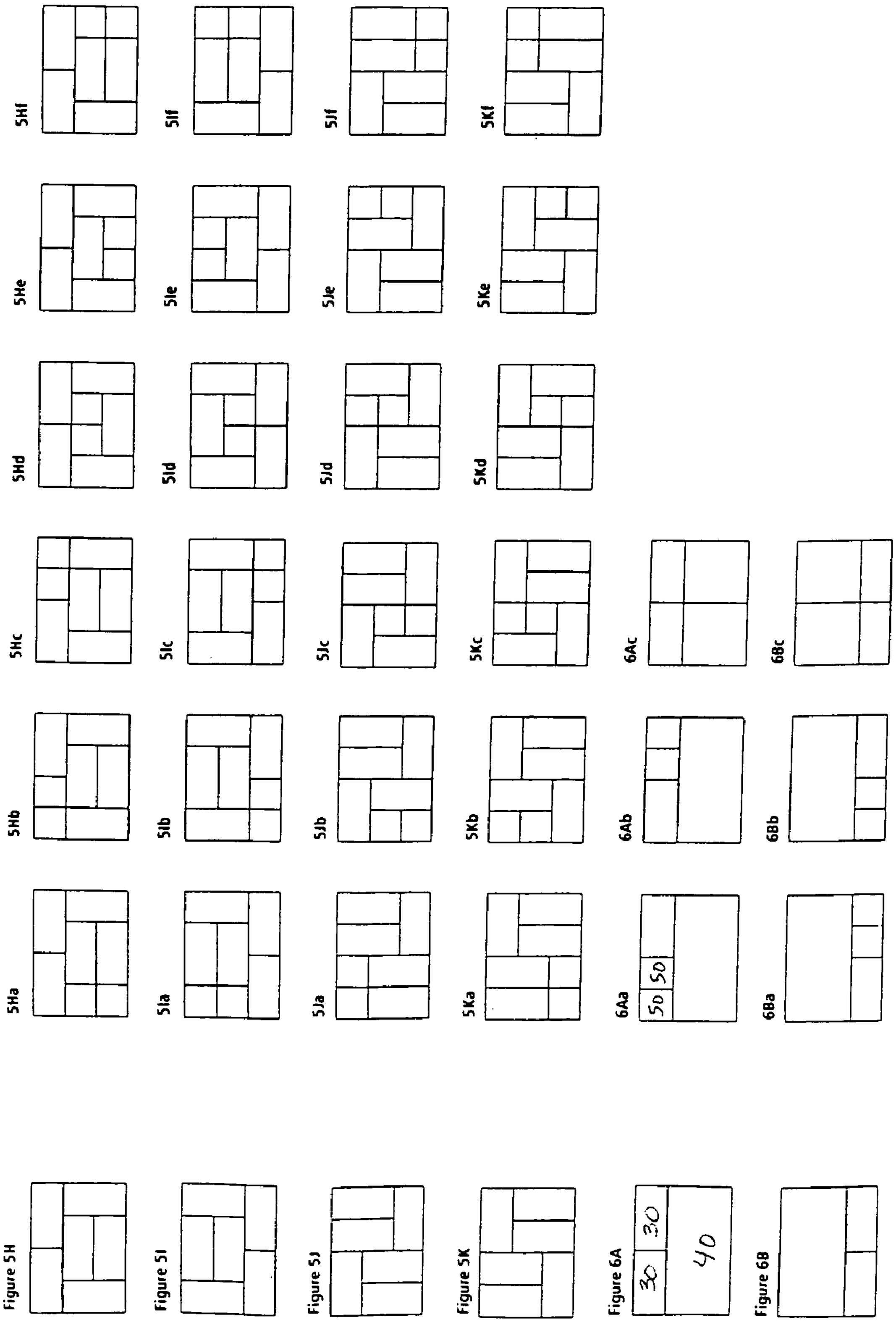
FIGS. 6A and 6B show templates having a three-by-four dimensional ratio and divided into a grid structure based on a Japanese tatami mats of different relative sizes.
Figures 7A, 7B, 7C, 7D, 7E, 7F, 7G, 7H, 7I:
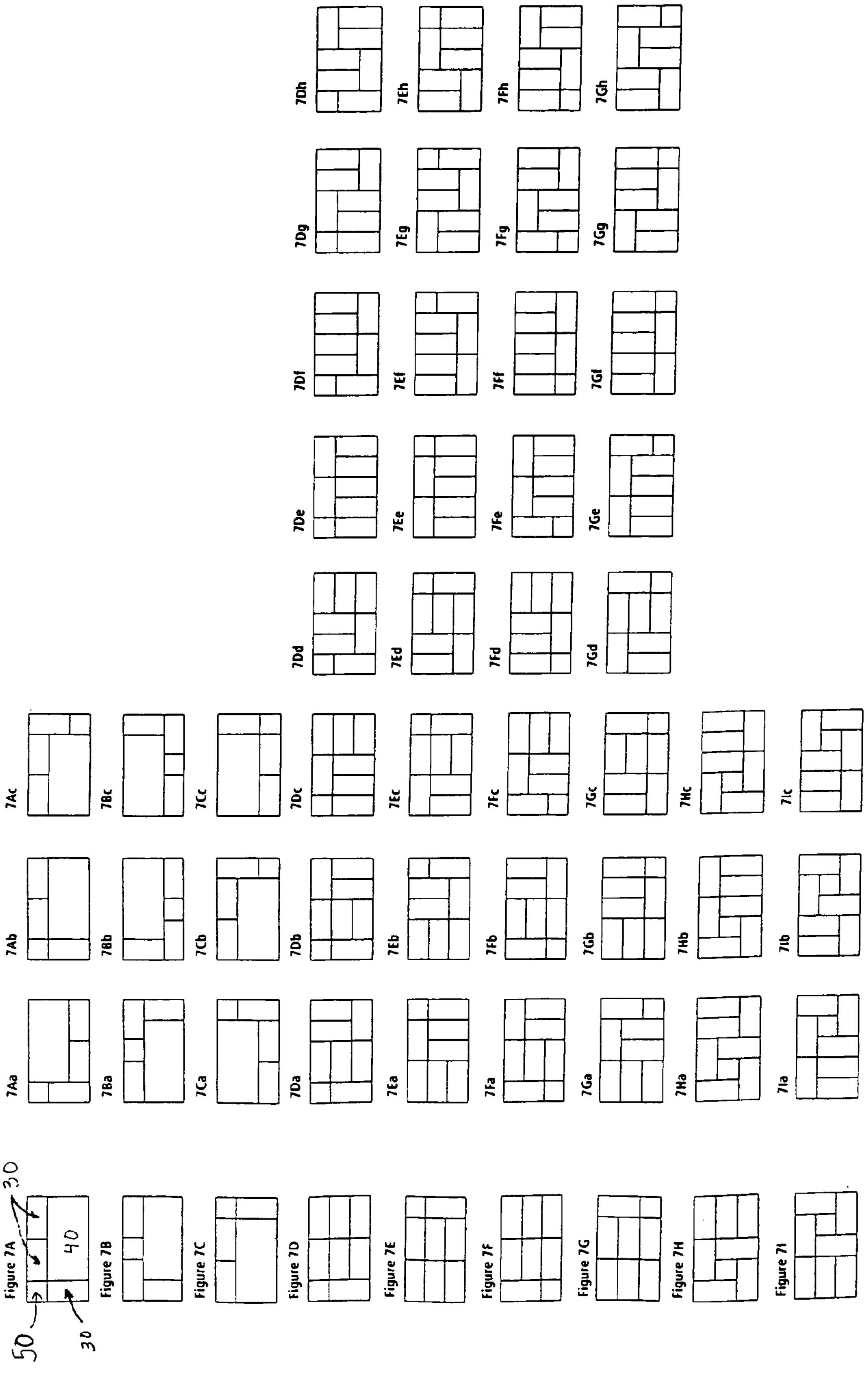
FIGS. 7A–7I show templates having a three-by-five dimensional ratio and divided into a plurality of grids having dimensions based on a Japanese tatami mat.

Exemplary templates based on templates with only tatami mats 30 (grids having the dimensions of a standard Japanese tatami mat), but having square grids 50 instead of only tatami mat 30, are shown in Figures labeled with the same Figure number of the related template followed by a lower case letter. Thus, a modification of the template of FIG. 2A, dividing at least one area filled by a single tatami mat 30 in FIG. 2A into two side-by-side square grids, is illustrated in FIGS. 2Aa and 2Ab. Similarly, FIGS. 2Ba and 2Bb show modifications of the template of FIG. 2B; FIGS. 3Aa–3Ac show modifications of the template of FIG. 3A, FIGS. 3Ba–3Bc show modifications of the template of FIG. 3B; FIGS. 3Ca–3Cc show modifications of the template of FIG. 3C; FIGS. 4Aa–4Ad show modifications of the template of FIG. 4A; FIGS. 4Ba–4Bd show modifications of the template of FIG. 4B; FIGS. 4Ca–4Cd show modifications of the template of FIG. 4C, FIGS. 4Da–4Dd show modifications of the template of FIG. 4D; FIGS. 4Ea–4Ed show modifications of the template of FIG. 4E; FIGS. 5Aa–5Af show modifications of the template of FIG. 5A; FIGS. 5Ba–5Bf show modifications of the template of FIG. 5B; FIGS. 5Ca–5Cf show modifications of the template of FIG. 5C; FIGS. 5Da–5Df show modifications of the template of FIG. 5D; FIGS. 5Ea–5Ef show modifications of the template of FIG. 5E; FIGS. 5Fa–5Ff show modifications of the template of FIG. 5F; FIGS. 5Ga–5Gf show modifications of the template of FIG. 5G; FIGS. 5Ha–5Hf show modifications of the template of FIG. 5H; FIGS. 5Ia–5If show modifications of the template of FIG. 51; FIGS. 5Ja–5Jf show modifications of the template of FIG. 5J; FIGS. 5Ka–5Kf show modifications of the template of FIG. 5K; FIGS. 6Aa–6Ac show modifications of the template of FIG. 6A; and FIGS. 6Ba–6Bc show modifications of the template of FIG. 6B.

It will be appreciated that the principles of the present invention may be applied to provide a large variety of screen template configurations for a variety of data/information entry and display programs and situations. The content developer, or user, thus has great latitude in customizing the screen to best suit his or her needs and/or tastes. The division of the screen into elongated units having the dimensions of a traditional Japanese tatami mat, as well as square units as desired, also permits a variety of arrangements of data or information. The templates may be rearranged, as desired, to reconfigure and reorganize the mosaic of information displayed by the screen in its entirety. It is also within the scope of the present invention to permit rearrangement of grids of templates 20 as desired by the end user to rearrange grids to suit his or her needs and/or tastes.

Working with the TatamiNet family of templates, a content developer may program a site to allow users the opportunity to configure their screens through geometric rearrangement to allow for cultural preferences. For example, the text to be displayed may either be read in the vertical direction (e.g., Japanese) or in the horizontal direction (e.g., English). In particular, the on-screen information presented is subdivided into a number of grids making up a template having the dimensions of the screen on which the template is to be used and displayed. The content developer may create multiple pages within the same general grouping (e.g., 2×2, 2×3, etc.) to allow the end-user to choose the compositional model that best suits their cultural preference: left to right, top to bottom, or a combination of the two. In this way, (as discussed in more detail below with reference to FIG. 10) the interface can be customized at will to suit not only the tastes and aesthetics of users at large, but also the orientation demands of either the Japanese (and more generally, Asian) or the Western user. Alternatively, the screen may be programmed to automatically generate alternate configurations within the same TatamiNet groupings, to allow the end-user to select any configuration within the grouping. The system may also be configured to query any language preferences stored on the end-user's computer or otherwise associated with the user.

Figure 8B:
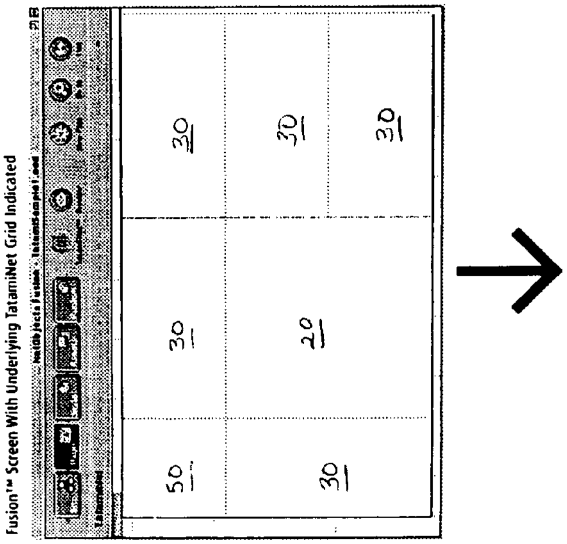
FIGS. 8*b* and 8*c* illustrate a web authoring program using a template system of the present invention.
Figure 8C:
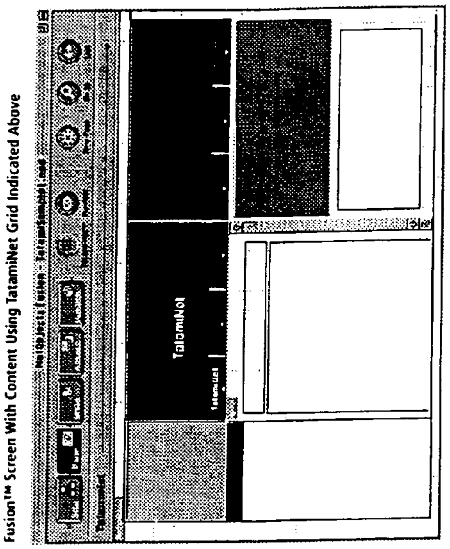
Figure 8:
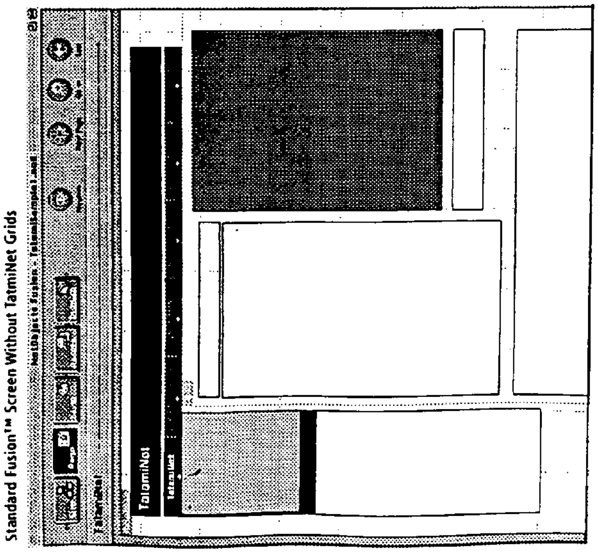
FIG. 8*a* illustrates a standard web authoring program using a prior art screen division.

The templates of the present invention may be provided as a series of templates for web authoring tools, such as Fusion™. FIG. 8 shows the difference between a Web authoring program using a prior art screen division, FIG. 8*a*, and one using a template system of the present invention, FIGS. 8*b* and 8*c*.

Alternatively, the templates of the present invention can be implemented in various interfaces and programs as a system of repositionable frames with a grid: e.g., as a browser interface, as a plug-in to a browser, as an add-on to an internal communications application, or as a series of templates that work on "snap-to guides" within any software programs containing layout capabilities (e.g., Quark™, Filemaker™, etc.). In every instance, the templates automatically divide a screen into frames, each frame being used to enter or display data, information, graphics, etc., as desired. These frames may act as HTML-like frames. In some instances, the interface might allow the user to reposition the frames within the overall grid system.

Figure 9:
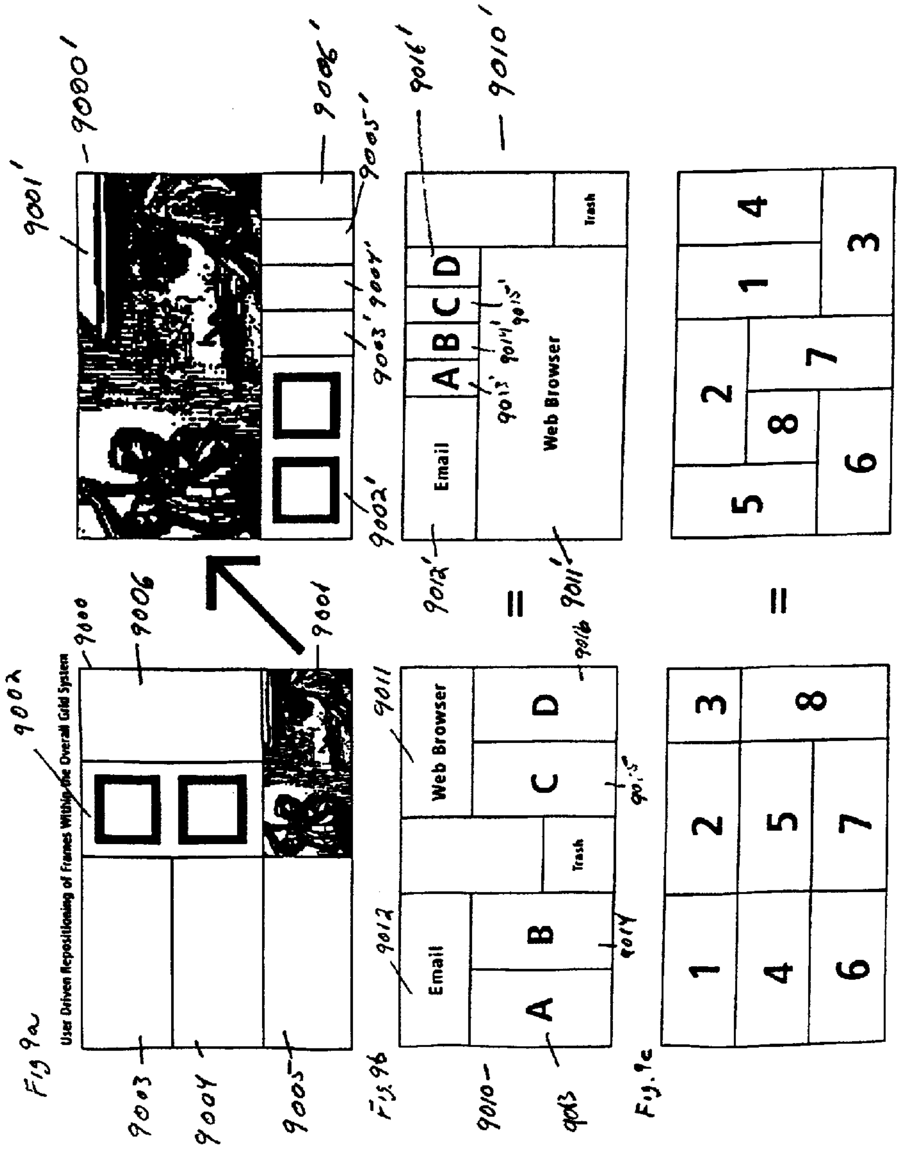
FIGS. 9*a*–9*c* illustrate various user driven repositioning of templates while maintaining the proportions the present invention.

FIGS. 9*a–c* show various examples of how such repositioning would appear to the user. The transition from screens 9000 to 9000' in FIG. 9*a* shows a typical example in which a mats may be enlarged or decreased while maintaining the proportions of the present invention. Graphic mat 9001 is shown as enlarged to 9001', mats 9003, 9004, 9005 and 9006 are decreased in size to 9003', 9004', 9005' and 9006', while mat 9002 maintains the same size but changes in orientation to 9002'.

FIG. 9*b* illustrates a typical implementation of this system as a so-called "desktop display" for an operating system. Screen 9010 illustrates a typical desktop display for a system using the present invention. A first section of the screen 9012 is used to display e-mail information, and a second section 9011 displays a web browser. The user may wish to focus on the web browser 9011 by increasing its size and changing its location. The system increases the size of web browser 9011' and decrease the size of other grids 9013–9016 to 9013'–9016'. Certain applications, such as e-mail 9012 may be selected to maintain their size 9012'. As illustrated, although the size and location of the grids is changed, the system maintains the proportions of the present invention. FIG. 9*c* also shows a transition wherein individual grids change size, but the overall system maintains the proportions of the present invention.

Figure 10:
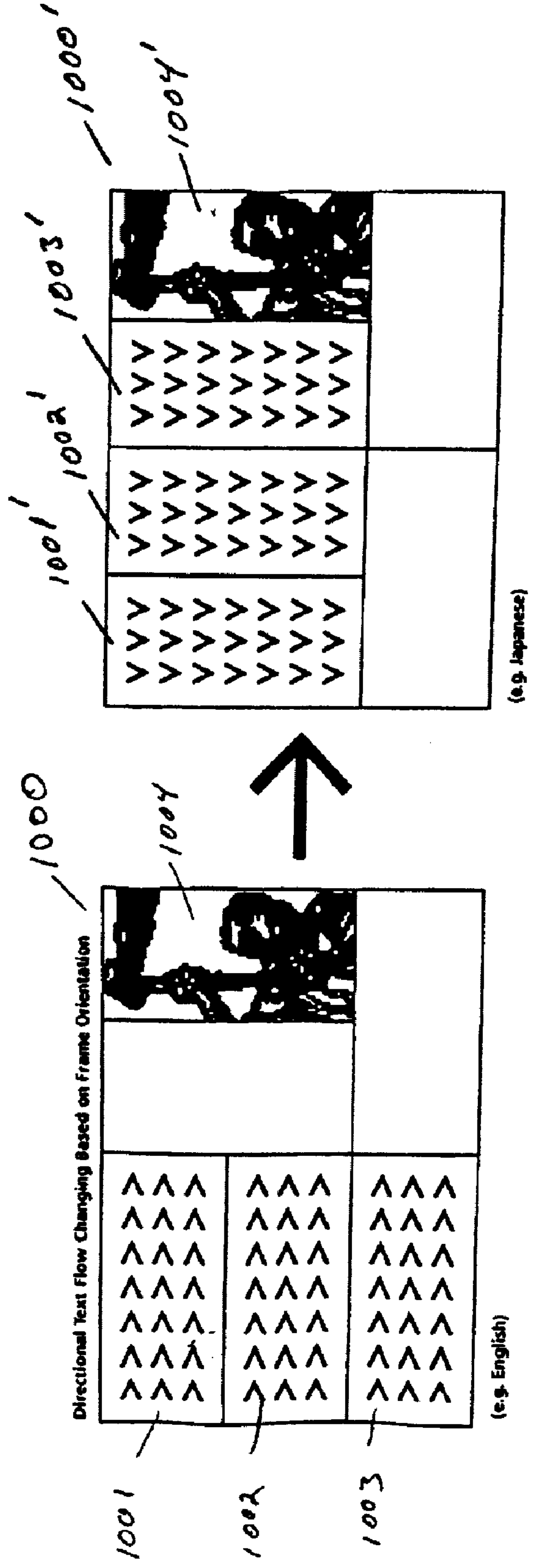
FIG. 10 illustrates directional text flow changing based on frame orientation.

As illustrated in FIG. 10, the interface may allow the user to have directional text flow correspond to the vertical or horizontal orientation of the frame within the grid. Thus, for example, a user viewing language having a horizontal directional flow may prefer a horizontal orientation for the mat containing such information (i.e. a 2×1 mat wherein the mat is 2 dimensional units high (horizontal axis) and 1 dimensional unit wide (vertical axis)), while a user viewing language having a vertical directional orientation may prefer a vertical orientation for the mat containing such information (i.e. a 1×2 mat wherein the mat is 1 dimensional unit high (horizontal axis) and 2 dimensional units wide (vertical axis)). FIG. 10 shows an example of how such directional text flow would appear to the user changing from a screen 1000 having a vertical directional text flow, as may be preferable for the English language, to a screen 1000' having a horizontal directional text flow, as may be preferable for the Japanese language (the term "text" including character based languages). Screen 1000 is divided into several TatamiNet mats, including mats 1001, 1002 and 1003 having a text in a vertical orientation as indicated by symbols ">" and mat 1004 displaying graphic information. For a Japanese language orientation screen 1000', text mats 1001, 1002 and 1003 would be converted into mats 1001', 1002' and 1003' having a horizontal orientation as indicated by symbols "v". As noted above, the system may allow the user to switch between vertical and horizontal orientations, or the orientation may be automatically changed based on the user's selected language which may be automatically selected based on user configuration information. Thus, TatamiNet may be used in many situations or applications requiring the entry and/or display of data or information, such as text or graphics.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, and components, without departing from the spirit or essential characteristics thereof. For instance, it will be appreciated that each template of the present invention is divided into grids that are preferably based on the dimensions of a Japanese tatami mat, it is within the scope of the invention to provide grids with different dimensional configurations as discussed above. One skilled in the art will appreciate that the invention may be used with many modifications of structure, arrangement, proportions, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

Figure 11:
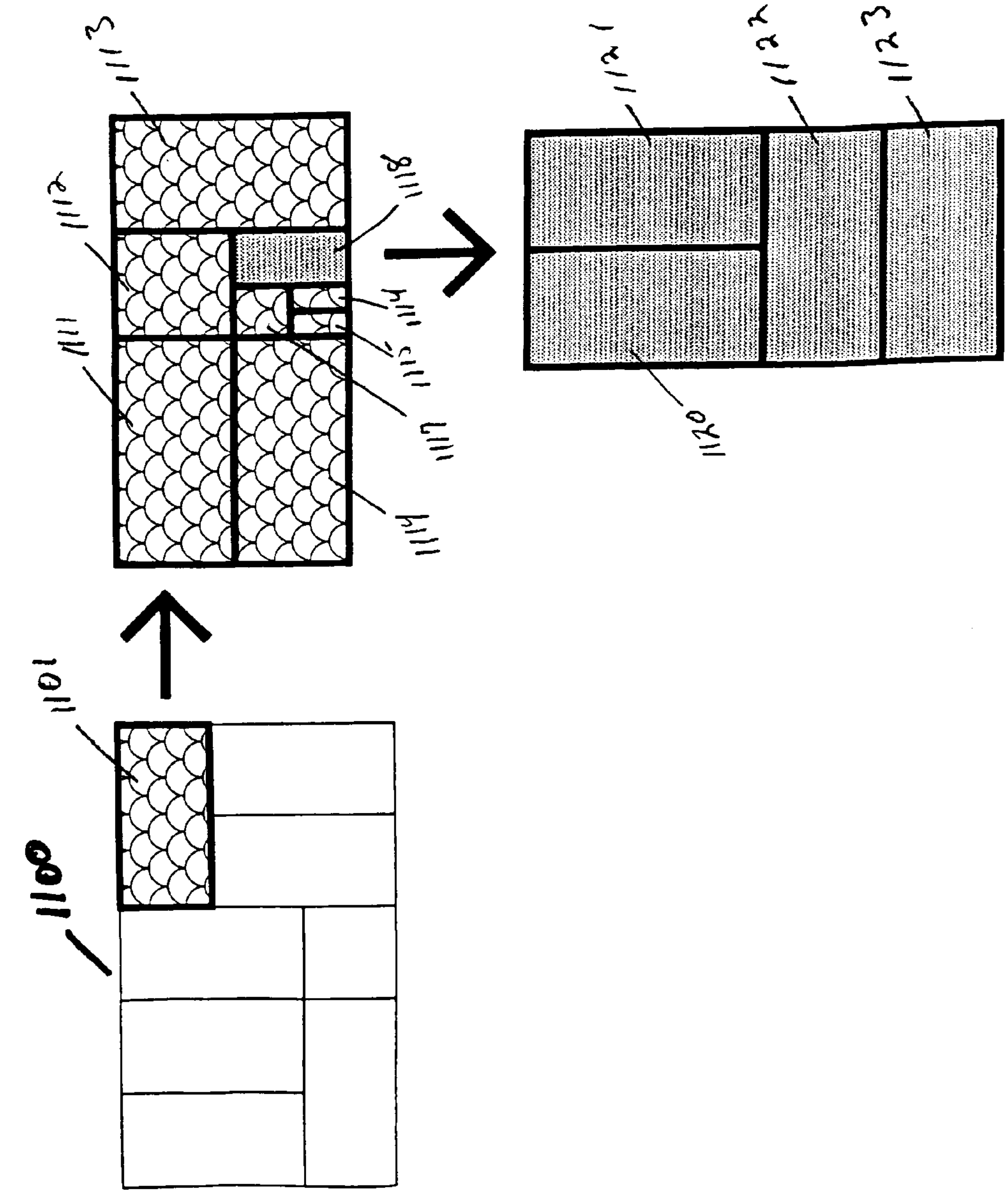
FIG. 11 illustrates the progression of delving into a complex TatamiNet grid of information that rests within a single tatami shape sitting within a TatamiNet grid.

Further, applications today primarily deal with the screen as a flat surface or two-dimensional space; in the near future, it is envisioned that the proposed invention would have application as well to the design and architecture of space conceived as virtual or three-dimensional. One example of such a potential development would solve the current problem where delving into a website involves going from one page to the next, flat pages "linked" to other flat pages. An after-arising development could allow one to enter "into" a page, delving into a complex TatamiNet grid of information that rests within a single tatami shape sitting within a TatamiNet grid. FIG. 11 shows an example of how the TatamiNet grid of information can be delved into by a user, taking one grid 1101 of the screen 1100 and enlarging it into it's own series 1111–1118 of TatamiNet grids. Likewise grid 1118 is enlarged into a new series 1120–1123 of TatamiNet grids.

What is claimed is:

1. A template data structure embodied on a computer-readable medium for computerized generation of a display of information on computer display devices, said template defining a display area with a dimensional configuration of a height of approximately a first whole number of dimensional units and a width of approximately a second whole number of dimensional units, said template data structure comprising: a plurality of grids combined and arranged together to fill the entire display area of said template, each of said grids being dimensioned to have approximately a two dimensional unit by one dimensional unit configuration, wherein only grids of the desired 2×1 unit length-to-width ratio of dimensions are used to form all display components filling the entire display area of said template data structure, such that the grids forming all display components are readily proportioned by the 2×1 dimensional unit ratio in the template data structure to fit together in whole numbers of dimensional units to fill the entire display area of the template data structure and said template data structure comprising instructions to automatically maintain the proportioning of said grids during operation on at least one of the grids of the template data structure to generate a resulting display on computer display devices, wherein all grids in said generated resulting display have the proportioning by the 2×1 dimensional unit length-to-width ratio of said grids and said operation on said at least one of the grids being at least one action selected from the group consisting of repositioning, resizing, reshaping, reorienting, and subdividing.

2. The template data structure of claim 1, wherein at least one of said grids is further subdivided into two sub-grids each having an approximately one dimensional unit by one dimensional unit configuration.

3. The template data structure of claim 1, wherein said template data structure is provided on a Web authoring program for generating pages for display with a browser program, said grids comprising frames in which information may be entered, through said authoring program and displayed via said browser program.

4. The template data structure of claim 1, wherein said template data structure is provided within a software program, said grids comprising frames in which information may be entered to and displayed via said software program.

5. The template data structure of claim 1, wherein said template data structure is provided at the level of an operating system of a computer, said grids comprising frames in which computer programs can be displayed.

6. A computerized system using a template data structure for computerized generation of a display of information on a computer display device, said template data structure defining a display area with a dimensional configuration of a height of approximately a first whole number of dimensional units and a width of approximately a second whole number of dimensional units and being subdivided into a plurality of grids combined and arranged together to fill the entire display area of said template, wherein each of said grids has an approximately two dimensional unit by one dimensional unit configuration, and wherein only grids of the desired 2×1 unit length-to-width ratio of dimensions are used to form all display components filling the entire display area of said template data structure, such that the grids forming all display components are readily proportioned by the 2×1 dimensional unit ratio in the template data structure to fit together in whole numbers of dimensional units to fill the entire display area of the template data structure wherein the template data structure automatically maintains the desired 2×1 dimensional unit length-to-width ratio of said grids during operation on at least one of the grids of the template data structure to generate a resulting display on computer display device, wherein all grids in said generated resulting display have the desired 2×1 dimensional unit length-to-width ratio of said grids and said operation on said at least one of the grids being at least one action selected from the group consisting of repositioning, resizing, reshaping, reorienting, and subdividing.

7. The template data structure system of claim 6, wherein at least one of said grids is further subdivided into two sub-grids each having an approximately one dimensional unit by one dimensional unit configuration.

8. The template data structure system of claim 6, wherein said system using said template data structure is provided in a Web authoring program for generating pages for display with a browser program, said grids comprising frames in which information may be entered, through said authoring program and displayed via said browser program.

9. The template data structure system of claim 6, wherein said system using said template data structure is provided within a software program, said grids comprising frames in which information may be entered to and displayed via said software program.

10. The template data structure system of claim 6, wherein said template data structure is provided at the level of an operating system of a computer, said grids comprising frames in which computer programs can be displayed.

11. A method of arranging information, including text and graphic images, in a computerized display employing a template data structure having a display area with a dimensional configuration of a height of approximately a first whole number of dimensional units and a width of approximately a second whole number of dimensional units, said method comprising the step of forming said template data structure subdivided into a plurality of grids combined and arranged together to fill the entire display area of said template, wherein each of said grids has an approximate two-by-one dimensional unit configuration, wherein only grids of the desired 2×1 unit length-to-width ratio of dimensions are used to form all display components filling the entire display area of said template data structure, such that the grids forming all display components are readily proportioned by the 2×1 dimensional unit ratio in the template data structure to fit together in whole numbers of dimensional units to fill the entire display area of the template data structure, and wherein the method automatically maintains the desired 2×1 dimensional unit length-to-width ratio of said grids during operation on at least one of the grids of the template data structure to generate a resulting display on computer display device, wherein all grids in said generated resulting display have the desired 2×1 dimensional unit length-to-width ratio of said grids and said operation on said at least one of the grids being at least one action selected from the group consisting of repositioning, resizing, reshaping, reorienting, and subdividing.

12. The method of claim 11, further comprising the step of providing a plurality of template data structures, each said template data structure having a different arrangement of grids of the desired 2×1 unit length-to-width ratio of dimensions that are used to form all display components filling the entire display area of said template data structure.

13. The method of claim 11, further comprising the step of entering information into each of said grids such that said template data structure is used to display different information in said grids.

14. The method of claim 11, further comprising the step of employing said template data structure in a Web authoring program for generating pages for display with a browser program in which information may be entered through said authoring program and displayed via said browser program.

15. The method of claim 11, wherein said template data structure is provided at the level of an operating system of a computer, said grids comprising frames in which computer programs can be displayed.

16. A method for employing a template data structure for generating a computerized screen display of a given display area for displaying text and other information on a computer display device, said text information having at least two formats, at least one of said formats having a horizontal direction orientation and at least one of said formats having a vertical direction orientation, said method comprising:

creating a first screen display by dividing the area of the display defined by a first template data structure into a first plurality of grids which are combined and arranged together to fill the entire area of the display, each of said plurality of grids being dimensioned to have approximately a two dimensional unit by one dimensional unit configuration, wherein only grids of the desired 2×1 unit length-to-width ratio of dimensions are used to form all display components filling the entire display area of said template data structure, wherein the method automatically maintains the desired 2×1 dimensional unit length-to-width ratio of said grids during operation on at least one of the grids of the template data structure to generate a resulting display on computer display device, wherein all grids in said generated resulting display have the desired 2×1 dimensional unit length-to-width ratio of said grids and said operation on said at least one of the grids being at least one action selected from the group consisting of repositioning, resizing, reshaping, reorienting, and subdividing, at least one of said first plurality of grids displaying said text information formatted in said horizontal direction orientation, said at least one grid having a horizontal orientation corresponding to the orientation of said textual information format;

creating a second screen display by dividing the area of the display defined by a second template data structure into a second plurality of grids which are combined and arranged together to fill the entire area of the display, each of said second plurality of grids being dimensioned to have approximately a two dimensional unit by one dimensional unit configuration, wherein only grids of the desired 2×1 unit length-to-width ratio of dimensions are used to form all display components filling the entire display area of said template data structure, wherein the method automatically maintains the desired 2×1 dimensional unit length-to-width ratio of said grids during operation on at least one of the grids of the template data structure to generate a resulting display on computer display device, wherein all grids in said generated resulting display have the desired 2×1 dimensional unit length-to-width ratio of said grids and said operation on said at least one of the grids being at least one action selected from the group consisting of repositioning, resizing, reshaping, reorienting, and subdividing, each of said grids having a horizontal or vertical orientation, at least one of said second plurality of grids displaying said text information formatted in said vertical direction orientation, said at least one grid having a vertical orientation corresponding to the orientation of said textual information format, selecting a first format for said text information from said at least two template data structures; and displaying said screen display having textual information entered in said selected template data structure.

17. The method of claim 16, wherein at least one of said grids is further subdivided into two sub-grids each having an approximately one dimensional unit by one dimensional unit configuration.

* * * * *